US009542439B1

(12) United States Patent
Cohen et al.

(10) Patent No.: US 9,542,439 B1
(45) Date of Patent: Jan. 10, 2017

(54) SIMPLIFIED QUERY LANGUAGE FOR ACCESSING METADATA (71) Applicant: EMC Corporation, Hopkinton, MA (US)

(72) Inventors: Jeffrey Ira Cohen, Sunnyvale, CA (US); Kurt Harriman, Novato, CA (US); Matthew Clark McCline, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 370 days.

(21) Appl. No.: 13/917,999

(22) Filed: Jun. 14, 2013

(51) Int. Cl.
*G06F 17/30* (2006.01)
(52) U.S. Cl.
CPC ... *G06F 17/30404* (2013.01); *G06F 17/30359* (2013.01); *G06F 17/30362* (2013.01)
(58) Field of Classification Search
CPC ............ G06F 17/30404; G06F 17/30359; G06F 17/30362
See application file for complete search history.

(56) References Cited

U.S. PATENT DOCUMENTS

| 5,745,896 | A | * | 4/1998 | Vijaykumar | G06F 17/30371 707/696 |
| 5,890,165 | A | * | 3/1999 | Boudrie | G06F 11/1451 |
| 8,732,138 | B2 | * | 5/2014 | Thomsen | G06F 17/30289 707/688 |
| 2002/0038450 | A1 | * | 3/2002 | Kloppmann et al. | 717/102 |
| 2007/0288534 | A1 | * | 12/2007 | Zak et al. | 707/204 |
| 2010/0287208 | A1 | * | 11/2010 | Mao | G06F 17/30604 707/803 |
| 2013/0013648 | A1 | * | 1/2013 | Monjas Llorente | G06F 17/30297 707/803 |

OTHER PUBLICATIONS

Green et al., "Oracle9i Database Performance Tuning Guide ands Reference", Oct. 2002, Oracle, Release 2 (9.2).*
Cyran et al., "Oracle9i Database Concepts", Mar. 2002, Oracle, Release 2 (9.2).*
Russel et al., "PL/SQL User's Guide and Reference", Mar. 2002, Release 2 (9.2).*
Lorentz et al., "Oracle9i SQL Reference", Oct. 2002, Release 2 (9.2).*
Cyran et al., "Oracle Database Concepts, 10g", Dec. 2003, Oracle, Release 1 (10.1).*
Adams et al., "Oracle Database Application Developer's Guide—Fundamentals, 10g", Dec. 2003, Release 1 (10.1).*
Lorentz et al., "Oracle Database SQL Reference 10g", Dec. 2003, Release 1 (10.1).*

(Continued)

*Primary Examiner* — Rehana Perveen
*Assistant Examiner* — Huen Wong
(74) *Attorney, Agent, or Firm* — Barry N. Young (57) ABSTRACT

A CaQL API is provided by receiving a query directed to a catalog that includes metadata. A catalog access target is determined based at least in part on one or more of the following: a CaQL keyword which is included in the query, a name of a table in the catalog which is included in the query, or a predicate which is included in the query. A catalog function is generated based at least in part on the CaQL keyword and the catalog function is performed on the catalog access target.

16 Claims, 9 Drawing Sheets

(56) References Cited

OTHER PUBLICATIONS

Russel et al., "PL/SQL User's Guide and Reference", Dec. 2003, Release 1 (10.1).*
Morales et al., "Oracle9i Database Reference", Oct. 2002, Oracle, Release 2 (9.2).*
Morales et al., "Oracle Database Reference, 10g", Dec. 2003, Oracle, Release 1 (10.1).*
Barlow et al., "Oracle Database Performance Tuning Guide, 10g", Dec. 2003, Oracle, Release 1 (10.1).*
Russell et al., "Oracle9i Application Developer's Guide—Fundamentals", Mar. 2002, Release 2 (9.2).*
Norbert Debes, "Secret ORACLE", 2008, Lulu Enterprise Inc., p. 48.*
Gray et al., "Granularity of locks in a shared data base", In Proceedings of the 1st International Conference on Very Large Data Bases (VLDB '75), 1975, pp. 428-451.
Leslie Lamport, "Proving the Correctness of Multiprocess Programs", IEEE Transactions on Software Engineering SE-3, No. 2, Mar. 1977, pp. 125-143.

* cited by examiner

PRIOR ART

```
/*
 * Setup a scan key to fetch from the index by segno.
 */

ScanKeyInit(&key,
     AttrNumber) 1,
     BTEqualStrategyNumber,
     F_OIDEQ,
     ObjectIdGetDatum(segno));

aoscan = index_beginscan(pg_aoseg_rel, pg_aoseg_idx,
snapshot, 1, &key);
tuple = index_getnext(aoscan, ForwardScanDirection);

if (!HeapTupleIsValid(tuple))
{
     /* This segment file does not have an entry. */
     index_endscan(aoscan);
     index_close(pg_aoseg_idx, AccessShareLock);
     heap_close(pg_aoseg_rel, AccessShareLock);
     return NULL;
}
```

300

302

304

PRIOR ART

```
SELECT * FROM <tablename> [WHERE <key1>=<key1value>
    [AND <key2>=<key2value>...]] [ORDER BY <column 1>[,
    <column 2>...]] [FOR UPDATE]
```

402

```
SELECT COUNT(*) FROM <tablename> [WHERE
    <key1>=<key1value> [AND <key2>=<key2value>...]]
    [ORDER BY <column 1>[, <column 2>...]]
```

404

```
DELETE FROM <tablename> [WHERE <key1>=<key1value> [AND
    <key2>=<key2value>...]]
```

FIG. 4

```
DELETE FROM <tablename> WHERE <key>=<keyvalue>
```
500

```
nDeletedRows = CaQLDeleteFrom(<tablename>, <keyvalue>...)
```
502

SIMPLIFIED QUERY LANGUAGE FOR ACCESSING METADATA

BACKGROUND OF THE INVENTION

The Greenplum database is large, scalable, shared-nothing Structured Query Language (SQL) database. The Greenplum database has a self-describing catalog which describes the state of the system and its contents. In other words, the Greenplum catalog includes metadata. Developer catalog access tools which access the Greenplum catalog are implemented in an inconsistent manner, some of which make the system vulnerable to failures and errors. Different developers over the years have worked on these catalog access tools, and the code has become quite large and is inconsistently implemented. New catalog access techniques which are easier for developers to use and/or which reduce exposure to potential system failures would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
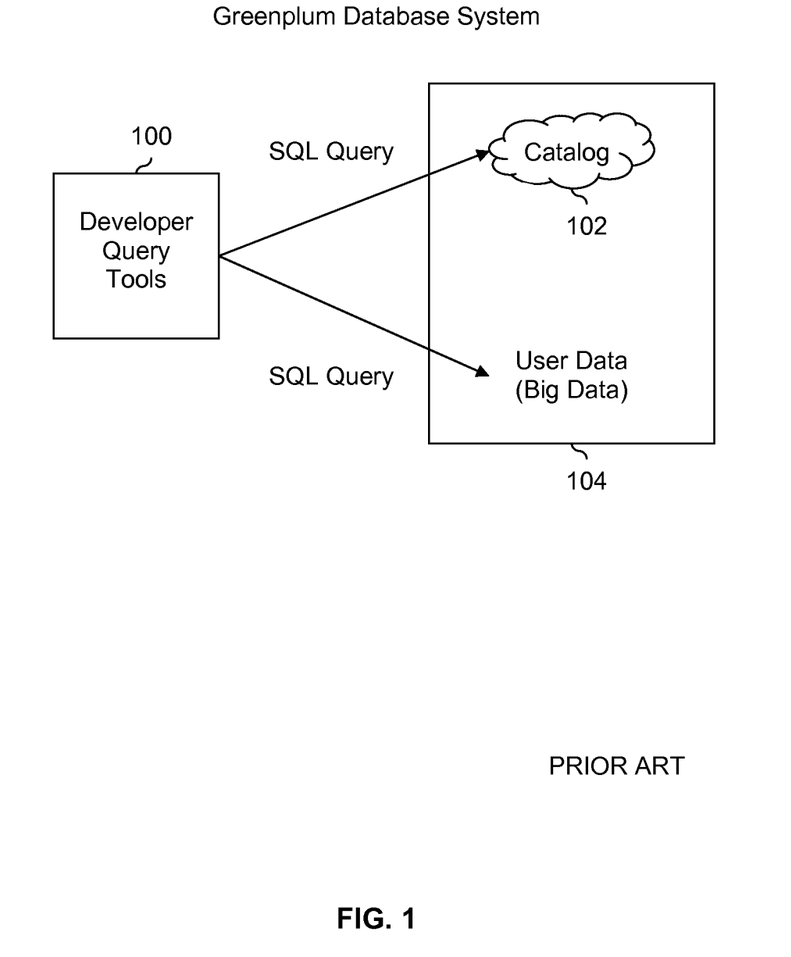
FIG. 1 is a diagram showing a Greenplum database system.

FIG. 1 is a diagram showing a Greenplum database system. For clarity, the Greenplum database system shown is a simplified version in order to focus on the aspects of the system which are relevant to this discussion. In the example shown, catalog 102 resides within and/or is co-located with user data 104 (e.g., they both reside on the same device). Catalog 102 comprises metadata (e.g., state information about the system, user data 104, and/or other system content). In one example, a catalog includes a table (e.g., pg_type) in which data types are defined. In another example, a catalog includes a table (e.g., pg_proc) in which functions or procedures are defined. These are merely some examples of metadata in catalog 102.

In this example, user data 104 comprises big data, for example on the order of petabytes or exabytes of data. SQL queries directed to user data 104 tend to be relatively complex processes and/or tend to analyze or touch relatively large amount of data.

Developer query tools 100 are created by and accessible to developers (e.g., Greenplum engineers). In some embodiments, developer query tools 100 are not accessible and/or visible to end users or customers (e.g., customers who purchase and use Greenplum database systems). In various embodiments, developer query tools 100 includes queries associated with creating, deleting, moving, and/or selecting things within catalog 102 and user data 104, such as tables, columns, objects, schema, and/or types. In this example, queries are constructed in or otherwise use Structured Query Language (SQL).

The following figure shows some example next generation database systems. These new generation database systems provide improved performance and new features not offered by the system shown in FIG. 1.

Figure 2:
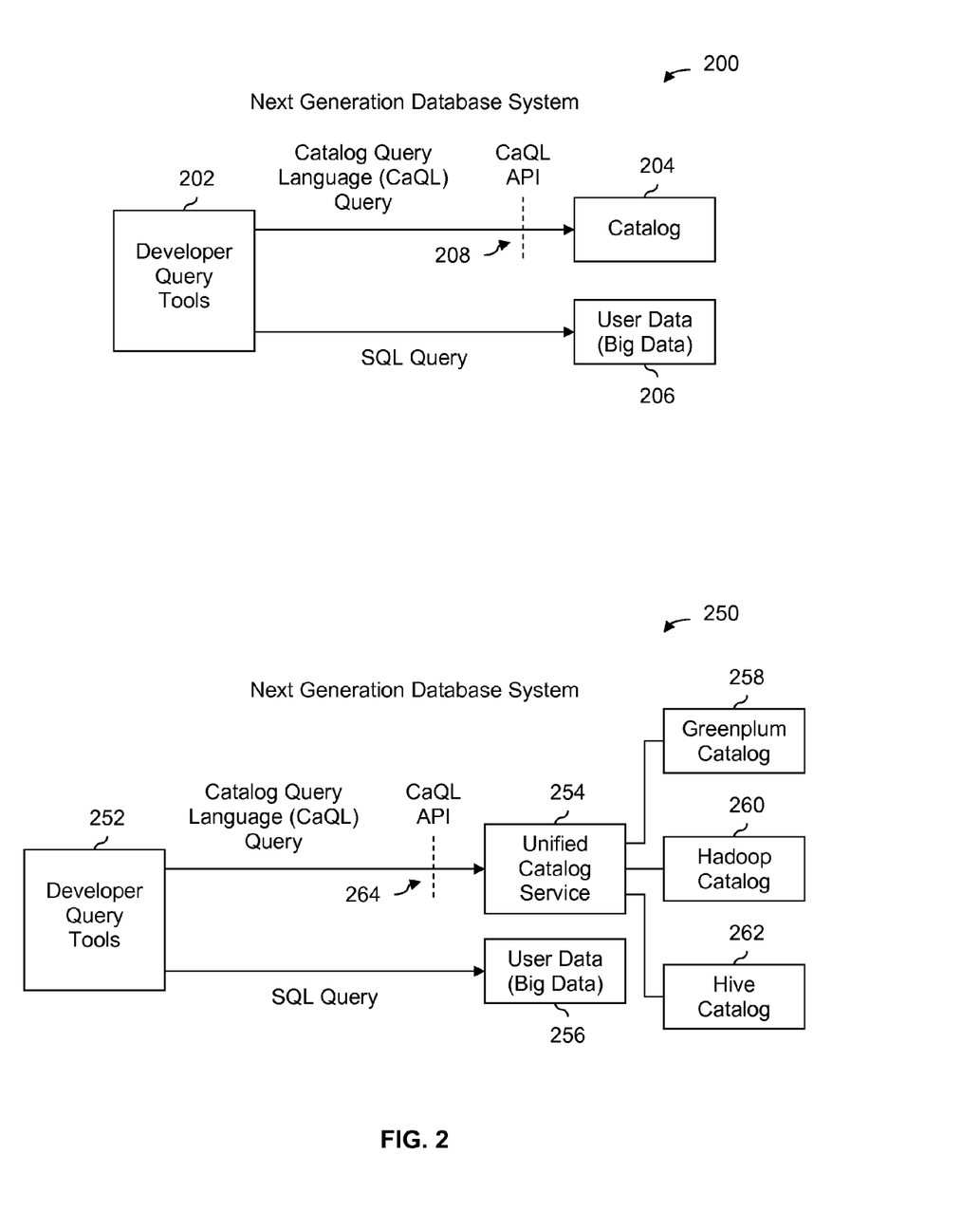
FIG. 2 is a diagram showing an embodiment of a next generation database system with an external catalog and an embodiment of a next generation database system with a Unified Catalog Service (UCS) supported catalog.

FIG. 2 is a diagram showing an embodiment of a next generation database system with an external catalog and an embodiment of a next generation database system with a Unified Catalog Service (UCS) supported catalog. In the example shown, both next generation database system 200 and 250 are next generation systems of the example Greenplum database system shown in FIG. 1. In one example deployment, next generation database system 200 is released first and then next generation database system 250 is released after that.

Unlike the Greenplum database system shown in FIG. 1, the catalogs shown here are not part of and/or stored with the user data with which it is associated. In next generation database system 200, for example, catalog 204 and user data 206 reside on different devices or systems (i.e., they are not co-located). This type of catalog may be referred to as an external catalog. In next generation database system 250, the catalog services different devices and different types of systems. In that example, the catalog includes Greenplum catalog 258, Hadoop catalog 260, and Hive catalog 262 where each catalog resides on its own device or system. Greenplum catalog 258, Hadoop catalog 260, and Hive catalog 262 are accessible via UCS 254. This type of catalog may be referred to as a UCS supported catalog. In one example, a common core of services is provided by UCS 254 and each client (e.g., Greenplum, Hadoop, Hive, etc.) uses the common core. In addition to the common core, some implementation-specific services and metadata, layered on the common core, are provided (at least in this example). To use an analogy, it is like a credit card: Visa and MasterCard provide core services (e.g., both provide a validation and transaction mechanism, both perform fraud detection, etc.), but individual banks have flexibility over certain things, such as transaction limits, finance charges, rewards, etc. to distinguish their particular "brand."

As in the previous figure, next generation database systems 200 and 250 are simplified in order to focus on the aspects of the system which are relevant to this discussion. For example, although user data 256 may be divided into Greenplum user data, Hadoop user data, and Hive user data (to correspond to catalogs 258, 260, and 262, respectively), each of which is on its own device, those elements are not shown in this figure.

The transition from the Greenplum database system shown in FIG. 1 to next generation database systems 200 and/or 250 is a major redesign of the catalog and offers an opportunity to improve upon catalog performance. First, a survey of existing catalog queries (e.g., SQL queries from developer query tools 100 in FIG. 1 to catalog 102) was conducted. In one example of how a survey is conducted (e.g., since catalog queries may be mixed together with user data queries), it is noted that in this example at least, various parts of catalog 102 in FIG. 1 are stored in a heap, index, system table (referred to herein as a systable and which can use heap or index access), and a system cache (referred to herein as a syscache and which can use an in-memory or index access). Note that a heap, index, systable, and syscache are not shown in FIG. 1. Developer query tools 100 in such embodiments may be searched for references to the heap, index, systable, or syscache in order to obtain a survey of catalog queries which exclude user data queries.

The survey revealed over 800 separate catalog interactions that was reduced to about 200 more basic SQL catalog queries. In reviewing these SQL catalog queries, it was noted that even though there were about 200 SQL catalog queries, they tended to fall into a much smaller number of generalized access categories.

First, it is noted that all accesses fall into two broad categories: multiple tuples are fetched (sometimes referred to herein as Iteration or Iterate) or at most one tuple is fetched (sometimes referred to herein as Unique where no tuples or only one tuple is fetched).

The cases of iterative fetch and unique fetch can be further divided into a variety of subcategories. For example, either the entire tuple is fetched, or a single column of the tuple is projected. Another example subcategory is whether the value of a tuple is fetched. Sometimes, the value of the tuple is not necessary (e.g., the tuple is merely counted to test for its existence, or deleted, or counted and deleted). Another example subcategory relates to reading or writing. If an entire tuple is fetched (for either the iterative case or unique case), it may be fetched for reading or it may be fetched with the intent that its contents will be updated (writing). Another example subcategory relates to sequencing and whether sequence is important or not. For example, if tuples are fetched iteratively (i.e., more than one tuple is fetched), it may be a requirement that the multiple tuples are returned in a particular order.

TABLE 1

Combinations of catalog access targets and types of access observed in the reduced set of about 200 SQL catalog queries.

| Catalog Access Target | Type of Access |
|---|---|
| Syscache | Unique |
| Syscache | Unique & Count |
| Syscache | Unique & Delete |
| Syscache | Unique & Count & Delete |
| Heap | Unique |
| Heap | Unique & Count |
| Heap | Unique & Delete |
| Heap | Unique & Count & Delete |
| Heap | Iterate |
| Heap | Iterate & Count |
| Heap | Iterate & Delete |
| Heap | Iterate & Count & Delete |
| Index | Unique |
| Index | Unique & Count |
| Index | Unique & Delete |
| Index | Unique & Count & Delete |
| Index | Iterate |
| Index | Iterate & Count |
| Index | Iterate & Delete |
| Index | Iterate & Count & Delete |
| Systable | Unique |
| Systable | Unique & Count |
| Systable | Unique & Delete |
| Systable | Unique & Count & Delete |
| Systable | Iterate |
| Systable | Iterate & Count |
| Systable | Iterate & Delete |
| Systable | Iterate & Count & Delete |

Table 1 shows combinations of catalog access targets and types of access observed in the reduced set of about 200 SQL catalog queries. The catalog access target column indicates whether the syscache, heap, index, or systable was targeted in order to access the catalog. The type of access column includes one or more of the following categories: Iterate (as described above when two or more tuples are fetched), Delete, Unique (as described above, when either no tuples are fetched or only one tuple is fetched), and Count.

Looking at the type of access column in Table 1, it is noted that the types of accesses can be categorized by just a few categories (in this example, Iterate, Unique, Delete, and Count). This may be because roughly half of the code is duplicate code (e.g., cut and paste with minor modifications, if any) and so the same kinds of accesses or operations are repeated many times. From this observation that the about 200 SQL catalog queries can be reduced to a much smaller set (e.g., using Iterate, Unique, Delete, and Count in this example), a number of things were realized. First, a simplified and/or reduced catalog query language is capable of satisfying queries to the catalog. Second, what operations or accesses should be included in or supported by the simplified and/or reduced catalog query language are revealed by the reduced set of general query categories to which the about 200 catalog queries were reduced.

Returning to the reduced set of about 200 SQL catalog queries, a review of them revealed inconsistencies in catalog access targets. A catalog access target refers to the various locations or types of memory where various parts of the catalog are kept. For example, one table in the catalog may be available in the heap and the index, and another table in the catalog may be available in the syscache. In some embodiments, different catalog access targets may be structured differently (e.g., some are ordered, some are not). In some embodiments, one catalog access target contains one set of tables from the catalog while another catalog access target contains a different set of tables. When there are multiple catalog access targets for a desired table or other desired content in the catalog, developers have a choice about what to target (e.g., heap, index, systable, or syscache) and must pick a catalog access target for their SQL query. In some cases, it may be undesirable or not optimal to use certain catalog access targets for certain operations. A benefit to a catalog query language (CaQL) application programming interface (API) (e.g., CaQL API 208 and/or 264) is that the CaQL API handles selection of a catalog access target. Since this is always performed by the CaQL API, a consistent and proper selection of catalog access targets can be enforced. Plus, a developer no longer has to know where various parts of the catalog are kept and what is the appropriate location or type of storage to target.

Another inconsistency revealed in the examination of the 220 SQL catalog queries relates to locking Locks, in general, are applied to things in a catalog (e.g., tables, data, or objects) in order to prevent exposure to catalog corruption, a system failure, or system error. If the catalog is left exposed through improper locking and an ill-timed operation is performed, the system may freeze or suffer a catastrophic failure. Improper locking may occur when the wrong lock strength is used (e.g., a shared lock is specified by a developer when an exclusive lock should have been used) and/or because of an improper sequencing of steps (e.g., a lock is improperly set after, as opposed to before, a window of time during which the catalog is vulnerable and/or exposed). In some embodiments, a catalog query language API (e.g., CaQL API 208 and/or 264) performs locking One benefit to this is that the developer does not need to figure out how to perform locking Another benefit is that proper and consistent locking techniques are enforced so that exposure to a system failure or system error is eliminated (or at least reduced).

In some embodiments, a catalog query language is a Data Manipulation Language (DML) as opposed to a Data Definition Language (DDL). As the names imply, DDL relates to definition, whereas DML relates to manipulation. Some example DDL-type operations include creating a new table and dropping an entire table. Some example DML-type operations include selecting content in a table, inserting content into a table, and deleting content in a table (e.g., without dropping the entire table). Typically, DDL-type operations do not occur during normal or daily operation of the catalog. They usually only occur during initialization (i.e., when the product is first installed) or during a catalog upgrade (e.g., at a major software revision, typically about every 1-2 years). As such, in some embodiments where a catalog query language is directed to DML but not DDL, a CaQL API supports keywords or queries associated with manipulating tuples or other contents of a table, but does not support keywords or queries which affect definitions (e.g., there is no support for creating a new table or dropping an entire table).

Although FIG. 2 shows the catalog query language used with an external catalog (e.g., next generation database system 200) and a UCS supported catalog (e.g., next generation database system 250), the catalog query language may be used with other systems. For example, a catalog query language may be used with an internal catalog (e.g., in FIG. 1, "SQL" between developer query tools 100 and catalog 102 would be replaced with "catalog query language").

In various embodiments, developer query tools 202 and 252 may come from a variety of sources or devices. For example, in a distributed system, the CaQL queries may come from a various devices throughout the distributed system (e.g., a master node, a segment, etc.). Although this is not necessarily shown in FIG. 2, some systems may be so configured.

Figure 3:
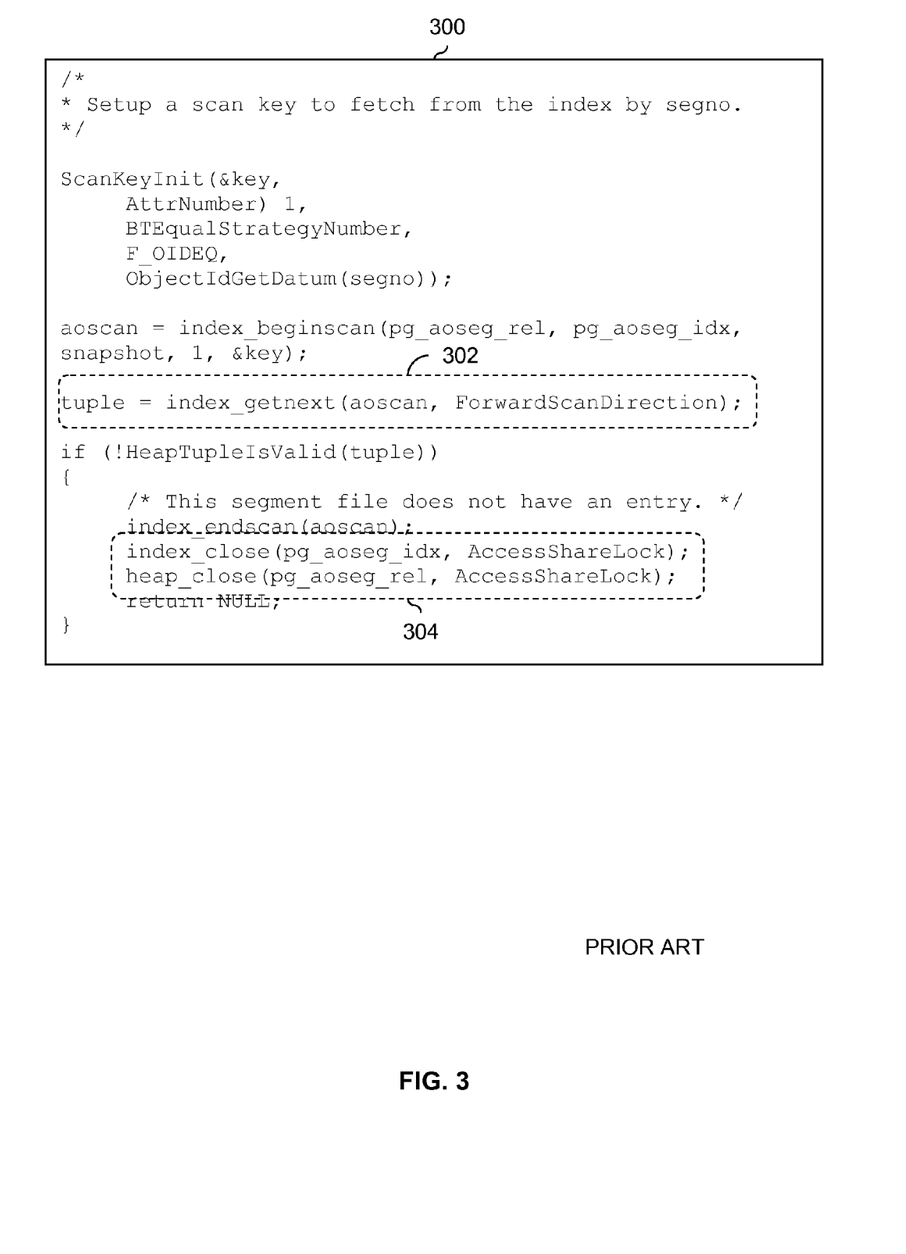
FIG. 3 is a diagram showing a SQL catalog query.

FIG. 3 is a diagram showing a SQL catalog query. For example, in FIG. 1, SQL query 300 may be sent from developer query tools 100 to catalog 102. Referring back to Table 1, the catalog access target for SQL query 300 would be classified as "Index" (see, for example, line 302 where the tuple is obtained from the index, as opposed to a systable or a heap) and the type of access would be classified as "Unique" since SQL query 300 either obtains a single tuple or returns a null (e.g., if a matching tuple does not exist). Also, as is shown in lines 304, a developer has to manage locking.

The following figure shows some example CaQL queries which illustrate some benefits not demonstrated by SQL query 300.

Figure 4:
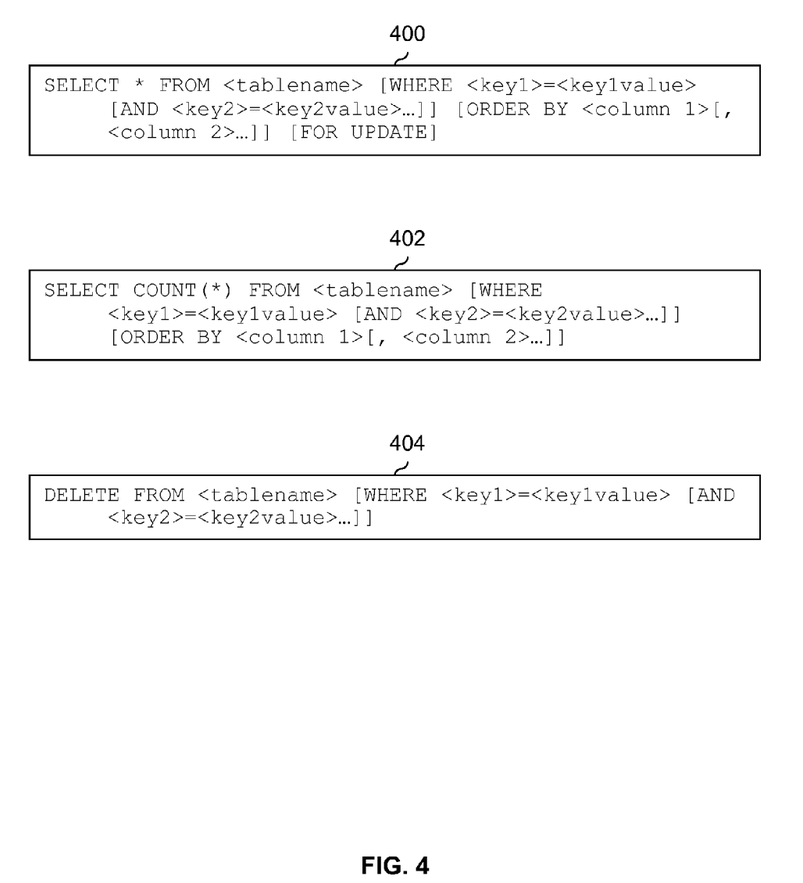
FIG. 4 is a diagram showing some embodiments of CaQL queries.

FIG. 4 is a diagram showing some embodiments of CaQL queries. In the examples shown, words in all caps (e.g., SELECT, FROM, WHERE, and so on) are keywords recognized by a CaQL API. A keyword is a reserved word recognized by the CaQL API for which there is a defined operation, interpretation, syntax, etc. In this figure and other figures, optional clauses are shown with braces (e.g., FOR UPDATE is an optional clause in CaQL query 400).

CaQL query 400 is associated with selecting specified tuples. In this example, the "*" distinguishes indicates a tuple (i.e., the entire row) should be fetched as opposed to only part of a row (e.g., a column). To indicate that a column (i.e., part of a row) should be selected instead of the entire row, the name of the column is specified (not shown).

The table from which the specified tuple(s) is/are selected is specified by FROM <tablename>. If no key values are specified (e.g., WHERE <key1>=<keylvalue> and so on) then all tuples in the table are selected. A WHERE clause is sometimes referred to herein as a predicate. Generally speaking, a predicate describes some property which desired data or a desired object possesses. If one or more key values are specified then only those tuple(s) which match the specified key value(s) are selected. In some embodiments, if no tuples match whatever conditions are specified or if a table is empty, then an invalid object identifier (or some other response indicating a null or empty set) is returned.

The number of rows which will be returned is not determined by or limited by whether an entire row is selected (e.g., using "*") or a column is projected (e.g., using <column_name>). The predicate (i.e., the WHERE clause) determines whether one row is fetched, multiple rows are fetched, or no rows are fetched. Note that a WHERE clause can (if desired) be more complex than simple equality. For example, operators or operations such as >, <, >=, or <= are permitted to be used if desired used in a WHERE clause.

The optional ORDER BY clause in CaQL query indicates whether the results returned should be ordered and if so how the results should be ordered or arranged.

The optional FOR UPDATE clause is used to indicate if the selected tuple(s) will be updated. If FOR UPDATE is specified, a different (e.g., stronger) locking process is performed by the CaQL API than if FOR UPDATE is not specified. If the strength of a lock is too weak (e.g., a shared lock is used where an exclusive lock should have been used) and/or a lock sequence does not follow a proper sequence, then the system is vulnerable to a deadlock or other system error/failure should the wrong catalog access come along. As such, in some embodiments, a CaQL API enforces proper locking when FOR UPDATE is specified with SELECT.

CaQL query 402 is similar to CaQL query 400 except that counting is performed. That is, instead of selecting the matching tuple(s), the number of matching tuples is returned. SELECT used with COUNT is useful because it simplifies the construction of existence tests (e.g., declare an error if this table does not exist or declare an error if there is a duplicate object name).

CaQL query 404 deletes specified tuple(s) from the table specified by <tablename>. Unlike CaQL queries 400 and 402, CaQL query 404 does not have an optional FOR UPDATE clause. A delete operation in and of itself is capable of putting the system into a vulnerable state should an improper locking procedure be used, since the delete is equivalent to an update, so it must acquire a stronger lock. In contrast, selecting without updating is not intrinsically capable of putting a system into a vulnerable state.

Returning to Table 1, it is noted that the column showing types of access includes: Iterate, Delete, Unique, and Count. The CaQL queries shown here show one example of how the types of accesses shown in Table 1 may be supported by a catalog access language. Naturally, some other CaQL APIs may support or implement Iterate, Delete, Unique, and Count using some other keywords or syntax; the CaQL queries shown in this figure are merely exemplary.

Returning to SQL query 300 in FIG. 3, a developer needs to have some understanding of the available catalog access targets and select, from the available catalog access targets, one for that particular query. Note, for example, in line 302 that the developer of SQL query 300 selected an index access method (see, e.g., index_getnext). Even if a developer is very experienced (s)he may use an improper access method which introduces bugs and/or vulnerabilities into the code. In contrast, access method is not specified by a developer in CaQL. See, for example, the CaQL queries in FIG. 4. None of the CaQL queries shown there specify (for example) the index, heap systable, or syscache. The CaQL API handles catalog access target and thus a developer does not need to know about catalog access targets and proper and consistent access to the catalog can be enforced.

In the example of FIG. 3, SQL query developers also need to perform locking. In lines 304 in FIG. 3, for example, the developer has implemented some locking related code. If a developer does not perform locking properly (e.g., because an improper lock strength is used, because some lock related sequencing is performed out of order, etc.), the system may be in a vulnerable state where an ill-timed operation can put the system into an error or failure state. Returning to FIG. 4, a developer in this embodiment does not have to manage or specify locking. The CaQL API (at least in this embodiment) performs the appropriate locking based on the specified keywords. For example, FOR UPDATE in CaQL query 400 triggers the CaQL API to perform an appropriate locking process so that the developer does not have to understand proper locking techniques and/or specify it in the CaQL query. Similarly, DELETE in CaQL query 404 triggers an appropriate locking process by the CaQL API.

In general, the example CaQL queries shown in this figure are at a high-level whereas the SQL query shown in FIG. 3 is at a low level. Having a catalog query language which is at a high level is a conscious design choice because it simplifies access to the catalog. Developers do not need to know low level details about the catalog (e.g., for the table in the catalog that I'm trying to access and this particular operation, what are the available catalog access targets and of those, which is the best catalog access target?) and can focus instead on high level functionality.

In various embodiments, a catalog access language and/or a CaQL API is implemented in a variety of ways. In some embodiments, a CaQL API is implemented using C. In some embodiments, a catalog query language is a static language where a build system compiles CaQL definitions into an efficient static plan (e.g., based upon some predefined set of catalog tables and indexes).

Figure 5:
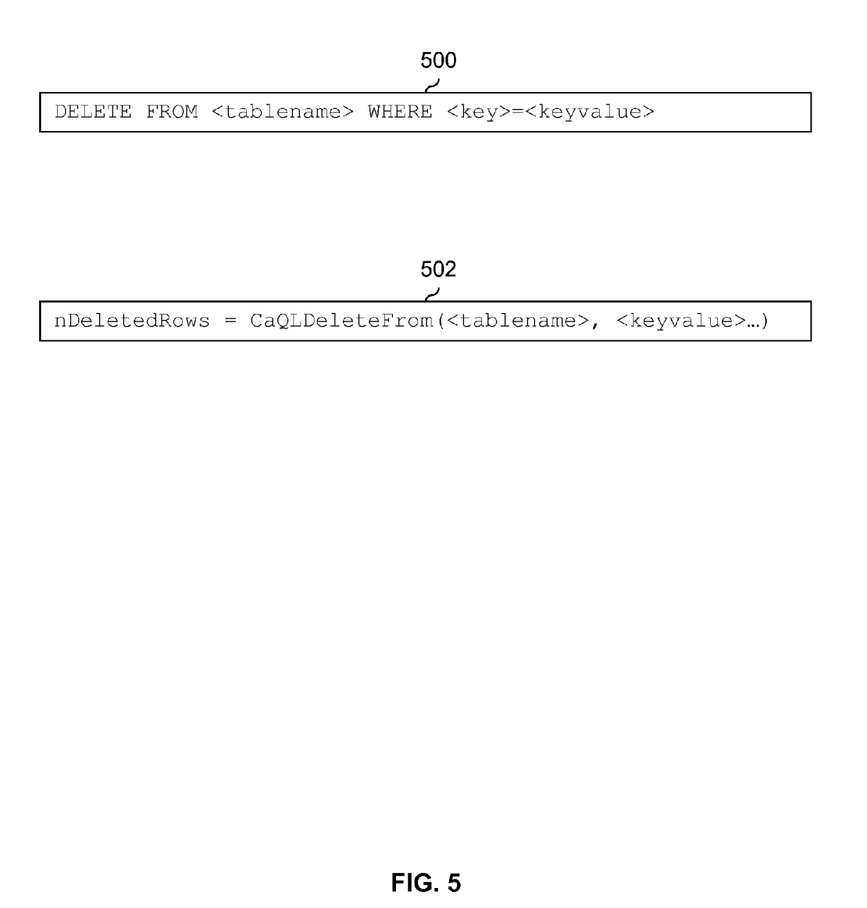
FIG. 5 is a diagram showing an embodiment of different forms of a CaQL query.

FIG. 5 is a diagram showing an embodiment of different forms of a CaQL query. In the example shown, CaQL queries 500 and 502 perform the same operation but are expressed in different forms. For example, CaQL query 502 is expressed in a more object oriented form. As shown in this figure, in various embodiments, CaQL APIs may accept CaQL queries which are expressed in a variety of forms. For example, one CaQL API embodiment may accept CaQL queries in the form shown in 500 and another CaQL API embodiment may accept CaQL queries in the form shown in 502.

Figure 6:
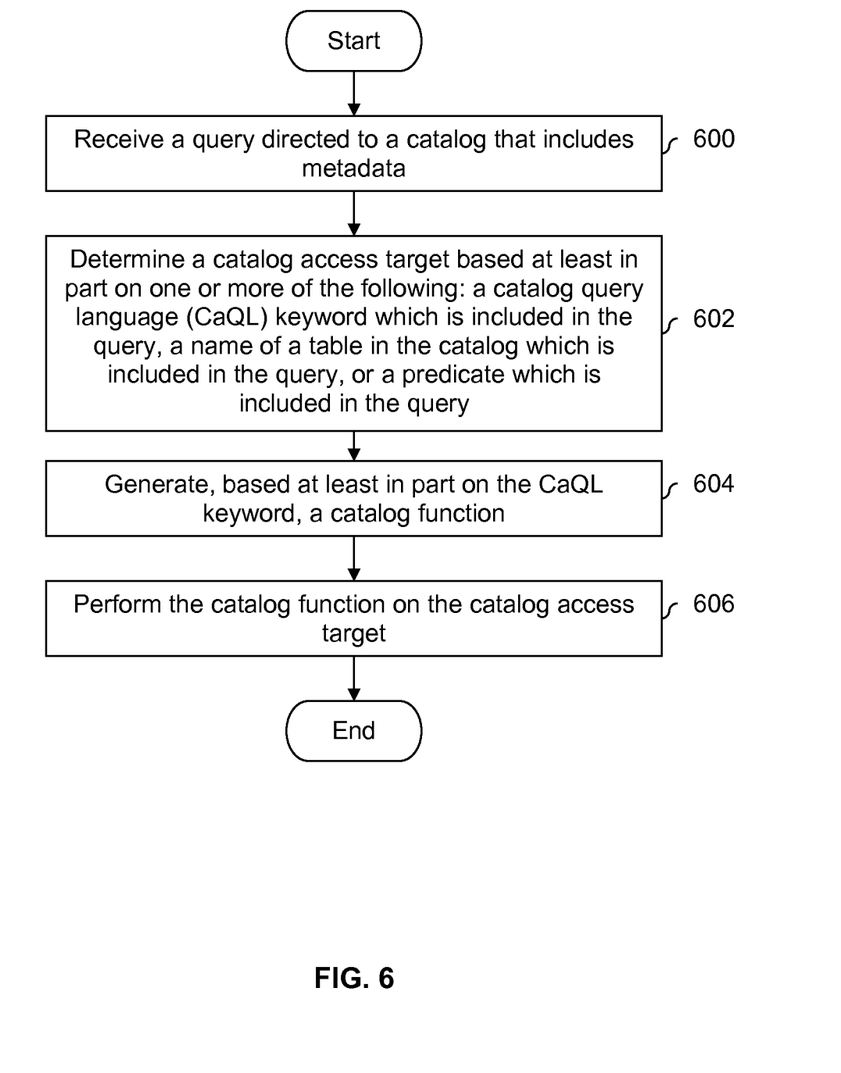
FIG. 6 is a flowchart illustrating an embodiment of a process for providing a CaQL API.

FIG. 6 is a flowchart illustrating an embodiment of a process for providing a CaQL API. For example, in FIG. 2, the process may be performed by CaQL API 208 or 264.

At 600, a query directed to a catalog that includes metadata is received. FIG. 4 shows some example queries which may be received at 600.

At 602, a catalog access target is determined based at least in part on one or more of the following: a catalog query language (CaQL) keyword which is included in the query, a name of a table in the catalog which is included in the query, or a predicate which is included in the query. In some cases, a table name (e.g., FROM <tablename> in FIG. 4) and a CaQL keyword (e.g., SELECT, FOR UPDATE, DELETE, etc. in FIG. 4) are specified in a CaQL query, the table name is used but the CaQL keyword is not, or the CaQL keyword is used by the table name is not. A CaQL keyword may be useful because for certain operations or modes, it may preferable to use certain catalog access targets over others. A table name may be helpful because certain tables are only available via certain catalog access targets. In some cases, a WHERE clause is specified and depending upon a specified key value or some other property specified by the WHERE clause, an appropriate catalog access target is selected. Naturally, in some embodiments, additional factors may be taken into consideration at step 602.

At 604, a catalog function is generated based at least in part on the CaQL keyword. For example, as described above, in some embodiments, a CaQL API is implemented using C. In some such embodiments, the catalog function is expressed in C. In some embodiments, generating a catalog function at 604 includes generating a locking process to be performed (e.g., if needed based on specified CaQL keywords such as DELETE or FOR UPDATE).

At 606, the catalog function is performed on the catalog access target. In various embodiments, various return values may be returned in response to performing a catalog function at 606 (e.g., a count if COUNT is specified, a null value if there is an error or no additional matching tuples exist, etc.).

The following figures describe some locking related processes. The example processes described below are not necessarily performed by all CaQL API embodiments but in some applications may be attractive because they provide expandable locking rules or procedures and/or make coding easier for a developer since they do not need to understand and/or implement locking.

Figure 7:
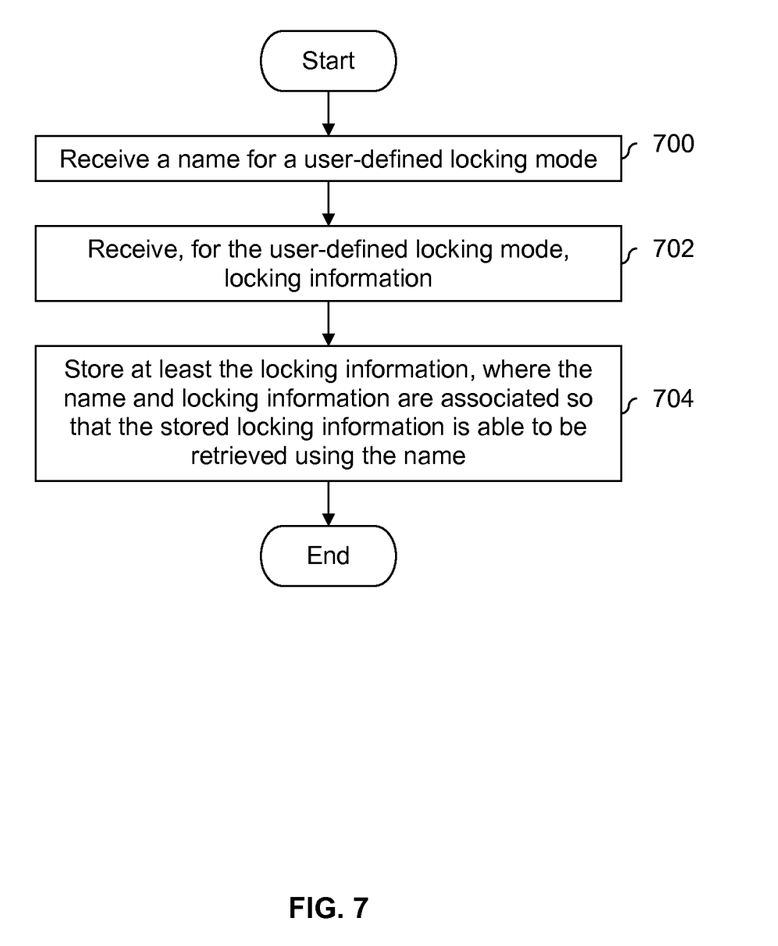
FIG. 7 is a flowchart illustrating an embodiment of a process for providing an interface for creating a user-defined locking mode.

FIG. 7 is a flowchart illustrating an embodiment of a process for providing an interface for creating a user-defined locking mode. In the example shown, the process is performed by a CaQL API to enable a developer to create a user-defined locking mode. In some embodiments, the process described below is performed in addition to the process described in FIG. 6.

At 700, a name for a user-defined locking mode is received. In one example, a developer wants to create a user-defined locking mode for debugging in which one or more specified tables are locked. For example, a developer may find it useful to have a debug mode in which one or more specified tables are locked using a specified lock in order to ensure that no queries are accessing those tables (e.g., because if those table are accessed when the exclusive lock is set, the exclusive lock cause an error message or exception to be returned). As an example of a name received at 700, a received name may be DEBUG_TABLE_LOCK.

At 702, for the user-defined locking mode, locking information is received. In general, locking information includes a syntax or set of rules describing how the user-defined locking mode should be performed or interpreted, for example if optional clauses are specified or not, in the presence of one or more specified CaQL keywords or not, etc. To continue the debug example described above, the associated locking information may specify that the table name(s) which follow DEBUG_TABLE_LOCK are to be locked with the specified lock(s). For example, the locking information would enable "DEBUG_TABLE_LOCK <tablename1> EXCLUSIVE <tablename2> SHARED" to be properly interpreted so that an exclusive lock is applied to the first table and a shared lock is applied to the second table. In some embodiments, locking information specified at 702 includes a proper locking sequence to be performed.

At 704, at least the locking information is stored, where the name and locking information are associated so that the stored locking information is able to be retrieved using the name. In one example, the locking information and name are stored together. In another example, the name is not stored, but the locking information is kept at an address or location which is a hash of the name. Any appropriate technique which enables the stored locking information to be retrieved given the name may be used.

Figure 8:
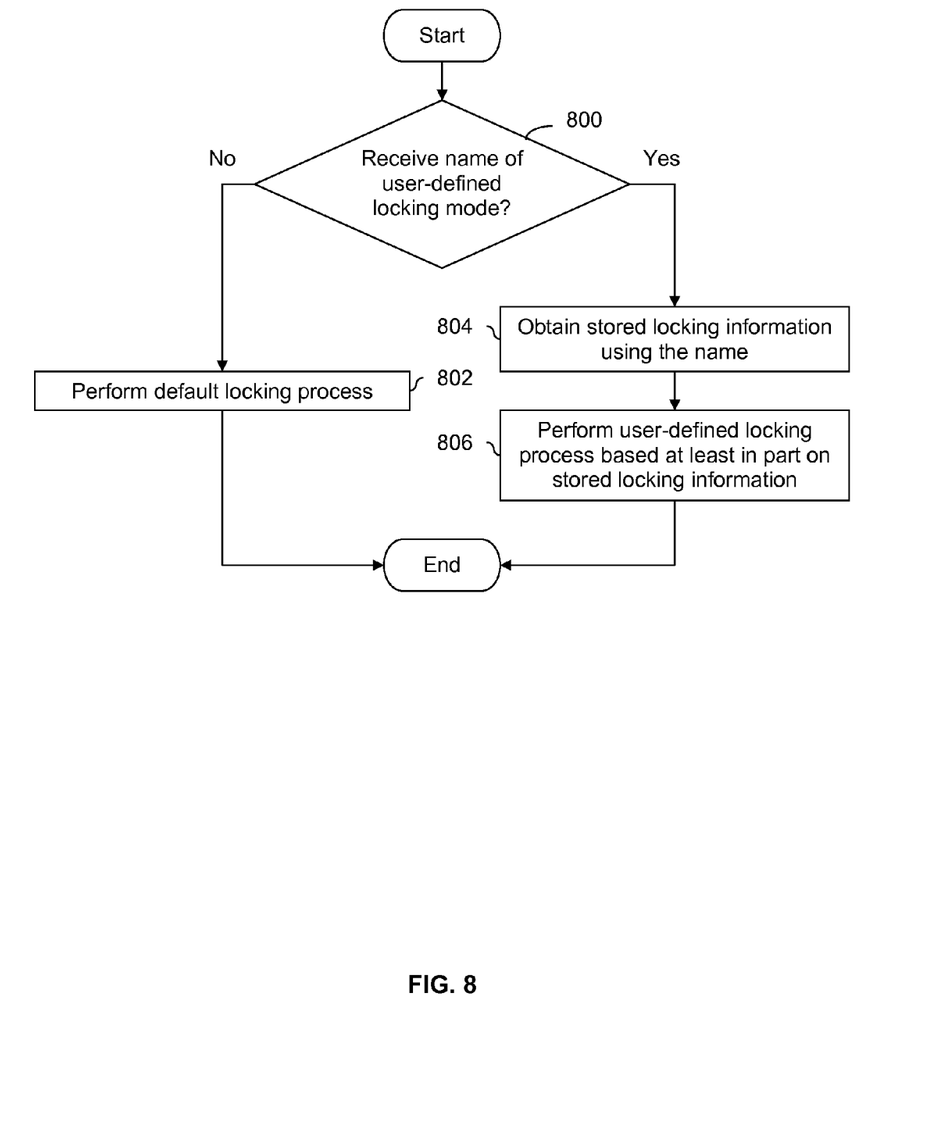
FIG. 8 is a flowchart illustrating an embodiment of a process for performing a locking process in response to receiving a CaQL query.

FIG. 8 is a flowchart illustrating an embodiment of a process for performing a locking process in response to receiving a CaQL query. For example, a CaQL API may have received any of CaQL queries 400, 402, or 404 in FIG. 4 and performs the example process in response. In some embodiments, the process described below is performed in addition to the processes described in FIGS. 6 and 7.

At 800, it is determined if the name of a user-defined locking mode is received. To continue the example from FIG. 7, a user may have created a user-defined locking mode named DEBUG_TABLE_LOCK and that name is used in a received CaQL query. If so, stored locking information is obtained using the name at 804 and a user-defined locking process is performed based at least in part on the stored locking information. For example, the stored locking information may indicate how to interpret the CaQL query which included the name of the user-defined locking mode and perform the appropriate locking. For example, the stored locking information may specify different locking modes, lock strengths, and so on depending upon what (optional) clauses are specified.

If the name of a user-defined locking mode is not received at 800, then at 802 a default locking process is performed. For example, if DELETE or FOR UPDATE are include in a CaQL query, then the default is to obtain an exclusive lock. If SELECT (without FOR UPDATE) is included in a CaQL query, then the default is to obtain a shared lock.

In some embodiments, to determine what tables should be locked at 802, a document or other data is accessed to determined relationships between objects and thus it is known what objects would be affected by the desired catalog access. In one example, suppose there is a catalog query to add a table to a schema in one session. If another session were to drop that same schema at the same time, this would result in a table in a nonexistent schema. To avoid this problem, for the query which adds the table to the schema, the CaQL API obtains a lock on the schema containing the table. To know which related tables need to be locked (in this example, a table which schema definitions needs to be locked), the CaQL API accesses a document describing table relationships in order to determine what additional tables need to be locked for completeness and correctness.

In some embodiments, a locking process takes advantage of a preexisting lock. Consuming duplicate locking resources may be expensive, so "piggybacking" off of an existing lock may be desirable in some applications. In some embodiments, the process described in the following figure is performed as part of step 802 and/or step 806.

Figure 9:
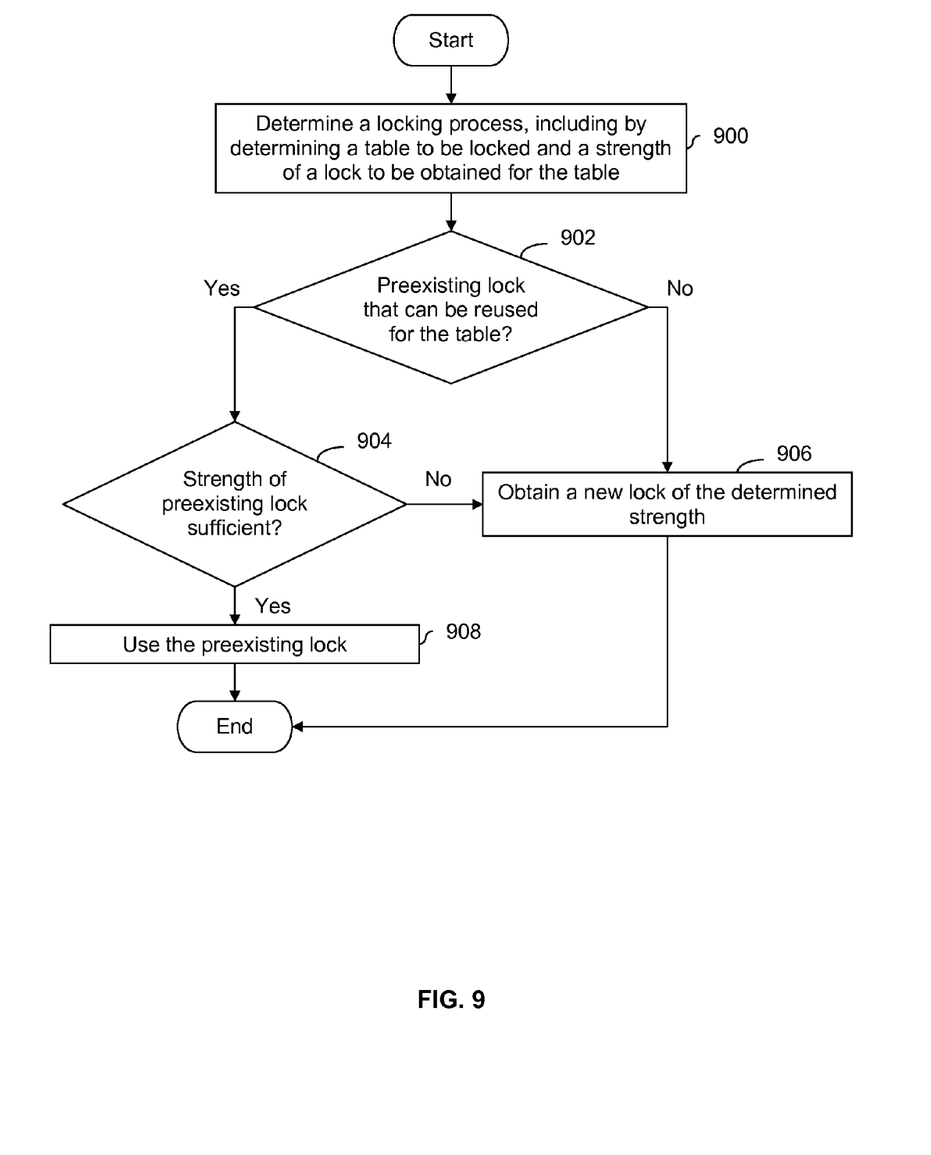
FIG. 9 is a flowchart illustrating an embodiment of a process for using an existing lock.

FIG. 9 is a flowchart illustrating an embodiment of a process for using an existing lock. The process described herein is performed by some CaQL API embodiments. At 900, a locking process is determined, including by determining a table to be locked and a strength of a lock to be obtained for the table. In some embodiments, step 900 includes determining a default locking process (e.g., the process shown in performed as part of step 802 in FIG. 8). In some embodiments, step 900 includes determining a user-defined locking process (e.g., the process shown in performed as part of step 806 in FIG. 8).

It is determined at 902 if there is a preexisting lock that can be reused for the table. In some embodiments, a preexisting lock is associated with a table other than the table which is desired to be locked. In one example system, tables have hierarchical relationships and a table is in a locked state if there is a lock applied to a higher-level table from which the lower-level table depends in the hierarchy. In some embodiments, if at step 900 it is determined that a lock on a first table is desired and there is a lock on a second table (from which the first table depends in a hierarchy), then it is determined at 902 there is a preexisting lock. Conversely, a lock on a higher-level table, where the lower-level table does not depend from the higher-level table, is not counted as a preexisting lock at 902 since a dependency between the two tables is required.

If it is determined there is no preexisting lock at 902, a new lock of the determined strength is obtained at 906. In some embodiments, in order to avoid locking tables which do not necessarily need to be locked at this time, the lock is obtained on the table determined at step 900 (e.g., and not at some higher level table).

If at 902 it is determined the preexisting lock can be reused for the table, it is determined at 904 if the strength of the preexisting lock is sufficient. For example, if an exclusive lock is desired and the lock in question is a shared lock, then the lock strength is not sufficient. If the strength is not sufficient, a new lock of the determined strength is obtained at 906.

If at 904 the strength is sufficient, the preexisting lock is used at 908. In some embodiments, this includes associating the determined table with the preexisting lock and/or adding ownership information to the preexisting lock so that it is known there is more than one owner of the lock. The preexisting lock would thereafter not be released until all owners said they were done with the lock. This may be useful in case the original owner of the existing lock decided to release the lock. It would not be desirable, for example, if the original owner released the lock without the permission of the later owner, otherwise the system would be vulnerable to system errors or failures. In some other embodiments, lock sharing is tracked or managed in some other manner.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing a catalog query language (CaQL) application programming interface (API), comprising:
   receiving, at a processor which performs the CaQL API, a query associated with performing an operation on a first table in a catalog, wherein the catalog includes metadata;
   using the processor to determine a catalog access target, wherein:
      determination of the catalog access target is based at least in part on one or more of the following: a catalog query language (CaQL) keyword which identifies the operation and is included in the query, the name of the first table in the catalog which is included in the query, or a predicate which is included in the query;
      the first table is located in a plurality of locations in the catalog, including two or more of the following: a heap, an index, a system table, or a system cache; and
      determination of the catalog access target includes selecting, based at least in part on the operation, a location from the plurality of locations such that the selected location includes one and only one of the following: the heap, the index, the system table, or the system cache;
   using the processor to determine if there is a preexisting lock on a second table that can be reused for the first table, wherein the first table is different from the second table;
   in the event it is determined that there is a preexisting lock on the second table that can be reused for the first table, using the processor to determine if the strength of the preexisting lock on the second table is sufficient;
   in the event: (a) it is determined that there is a preexisting lock on the second table that can be reused for the first table and (b) it is determined that the strength of the preexisting lock on the second table is not sufficient, obtaining a new lock for the first table;
   in the event: (1) it is determined that there is a preexisting lock on the second table that can be reused for the first table and (2) it is determined that the strength of the preexisting lock on the second table is sufficient, reusing the preexisting lock on the second table for the first table;
   generating, based at least in part on the CaQL keyword, a catalog function; and
   performing the catalog function on the selected location, and wherein
   in the event there is a lock on the second table and the first table depends from the second table, it is determined that there is a preexisting lock on the second table that can be reused for the first table; and
   in the event there is a lock on the second table and the first table does not depend from the second table, the lock on the second table does not count as a preexisting lock on the second table that can be reused for the first table.

2. The method of claim 1, wherein the method is performed by one or more of the following: an external catalog system or a unified catalog service (UCS) supported system.

3. The method of claim 1, wherein the CaQL keyword is associated with a Data Manipulation Language (DML) and excludes a Data Definition Language (DDL).

4. The method of claim 1, wherein the CaQL keyword is associated with one or more of the following: selecting content in a table, inserting content into a table, or deleting content in a table without dropping the entire table.

5. The method of claim 1 further comprising providing an interface for creating a user-defined locking mode, including by:
   receiving a name for the user-defined locking mode;
   receiving, for the user-defined locking mode, locking information; and
   storing at least the locking information, wherein the name and the locking information are associated so that the stored locking information is able to be retrieved using the name.

6. The method of claim 5 further comprising:
   determining if the name of the user-defined locking mode is received;
   in the event the name of the user-defined locking mode is not received, performing a default locking process; and
   in the event the name of the user-defined locking mode is received:
      obtaining the stored locking information using the name; and
      performing the user-defined locking process based at least in part on the stored locking information.

7. A system for providing a catalog query language (CaQL) application programming interface (API), comprising:
   a processor; and
   a memory coupled with the processor, wherein the memory is configured to provide the processor with instructions which when executed cause the processor to:
      receive, at the processor, a query associated with performing an operation on a first table in a catalog, wherein the catalog includes metadata;
      determine a catalog access target, wherein:
         determination of the catalog access target is based at least in part on one or more of the following: a catalog query language (CaQL) keyword which identifies the operation and is included in the query, the name of the first table in the catalog which is included in the query, or a predicate which is included in the query;
         the first table is located in a plurality of locations in the catalog, including two or more of the following: a heap, an index, a system table, or a system cache; and
         determination of the catalog access target includes selecting, based at least in part on the operation, a location from the plurality of locations such that the selected location includes one and only one of the following: the heap, the index, the system table, or the system cache;
determine if there is a preexisting lock on a second table that can be reused for the first table, wherein the first table is different from the second table;
in the event it is determined that there is a preexisting lock on the second table that can be reused for the first table, determine if the strength of the preexisting lock on the second table is sufficient;
in the event: (a) it is determined that there is a preexisting lock on the second table that can be reused for the first table and (b) it is determined that the strength of the preexisting lock on the second table is not sufficient, obtain a new lock for the first table;
in the event: (1) it is determined that there is a preexisting lock on the second table that can be reused for the first table and (2) it is determined that the strength of the preexisting lock on the second table is sufficient, reuse the preexisting lock on the second table for the first table;
generate, based at least in part on the CaQL keyword, a catalog function; and
perform the catalog function on the selected location, and wherein in the event there is a lock on the second table and the first table depends from the second table, it is determined that there is a preexisting lock on the second table that can be reused for the first table; and
in the event there is a lock on the second table and the first table does not depend from the second table, the lock on the second table does not count as a preexisting lock on the second table that can be reused for the first table.

8. The system of claim 7, wherein the memory is further configured to provide the processor with instructions which when executed cause the processor to provide an interface for creating a user-defined locking mode, including by:
receiving a name for the user-defined locking mode;
receiving, for the user-defined locking mode, locking information; and
storing at least the locking information, wherein the name and the locking information are associated so that the stored locking information is able to be retrieved using the name.

9. The system of claim 8, wherein the memory is further configured to provide the processor with instructions which when executed cause the processor to:
determine if the name of the user-defined locking mode is received;
in the event the name of the user-defined locking mode is not received, perform a default locking process; and
in the event the name of the user-defined locking mode is received:
obtain the stored locking information using the name; and
perform the user-defined locking process based at least in part on the stored locking information.

10. A computer program product for providing a catalog query language (CaQL) application programming interface (API), the computer program product being embodied in a non-transitory computer readable storage medium and comprising computer instructions for:
receiving, at a processor which performs the CaQL API, a query associated with performing an operation on a first table in a catalog, wherein the catalog includes metadata;
determining a catalog access target, wherein:
determination of the catalog access target is based at least in part on one or more of the following: a catalog query language (CaQL) keyword which identifies the operation and is included in the query, the name of the first table in the catalog which is included in the query, or a predicate which is included in the query;
the first table is located in a plurality of locations in the catalog, including two or more of the following: a heap, an index, a system table, or a system cache; and
determination of the catalog access target includes selecting, based at least in part on the operation, a location from the plurality of locations such that the selected location includes one and only one of the following: the heap, the index, the system table, or the system cache;
determining if there is a preexisting lock on a second table that can be reused for the first table, wherein the first table is different from the second table;
in the event it is determined that there is a preexisting lock on the second table that can be reused for the first table, determining if the strength of the preexisting lock on the second table is sufficient;
in the event: (a) it is determined that there is a preexisting lock on the second table that can be reused for the first table and (b) it is determined that the strength of the preexisting lock on the second table is not sufficient, obtaining a new lock for the first table;
in the event: (1) it is determined that there is a preexisting lock on the second table that can be reused for the first table and (2) it is determined that the strength of the preexisting lock on the second table is sufficient, reusing the preexisting lock on the second table for the first table;
generating, based at least in part on the CaQL keyword, a catalog function; and
performing the catalog function on the selected location, and wherein
in the event there is a lock on the second table and the first table depends from the second table, it is determined that there is a preexisting lock on the second table that can be reused for the first table; and
in the event there is a lock on the second table and the first table does not depend from the second table, the lock on the second table does not count as a preexisting lock on the second table that can be reused for the first table.

11. The method of claim 1, wherein:
the first table and the second table reside in a hierarchy of tables where the first table is a lower-level table in the hierarchy and the second table is a higher-level table in the hierarchy.

12. The system of claim 7, wherein:
the first table and the second table reside in a hierarchy of tables where the first table is a lower-level table in the hierarchy and the second table is a higher-level table in the hierarchy.

13. The computer program product of claim 10, wherein:
the first table and the second table reside in a hierarchy of tables where the first table is a lower-level table in the hierarchy and the second table is a higher-level table in the hierarchy.

14. The method of claim 1, wherein reusing the preexisting lock on the second table for the first table includes: adding ownership information to the preexisting lock such that the first table is an owner of the preexisting lock in addition to the second table.

15. The system of claim 7, wherein the instructions for reusing the preexisting lock on the second table for the first table include instructions for: adding ownership information to the preexisting lock such that the first table is an owner of the preexisting lock in addition to the second table.

16. The computer program product of claim 10, wherein the computer instructions for reusing the preexisting lock on the second table for the first table include computer instructions for: adding ownership information to the preexisting lock such that the first table is an owner of the preexisting lock in addition to the second table.

\* \* \* \* \*